United States Patent Office 2,879,005
Patented Mar. 24, 1959

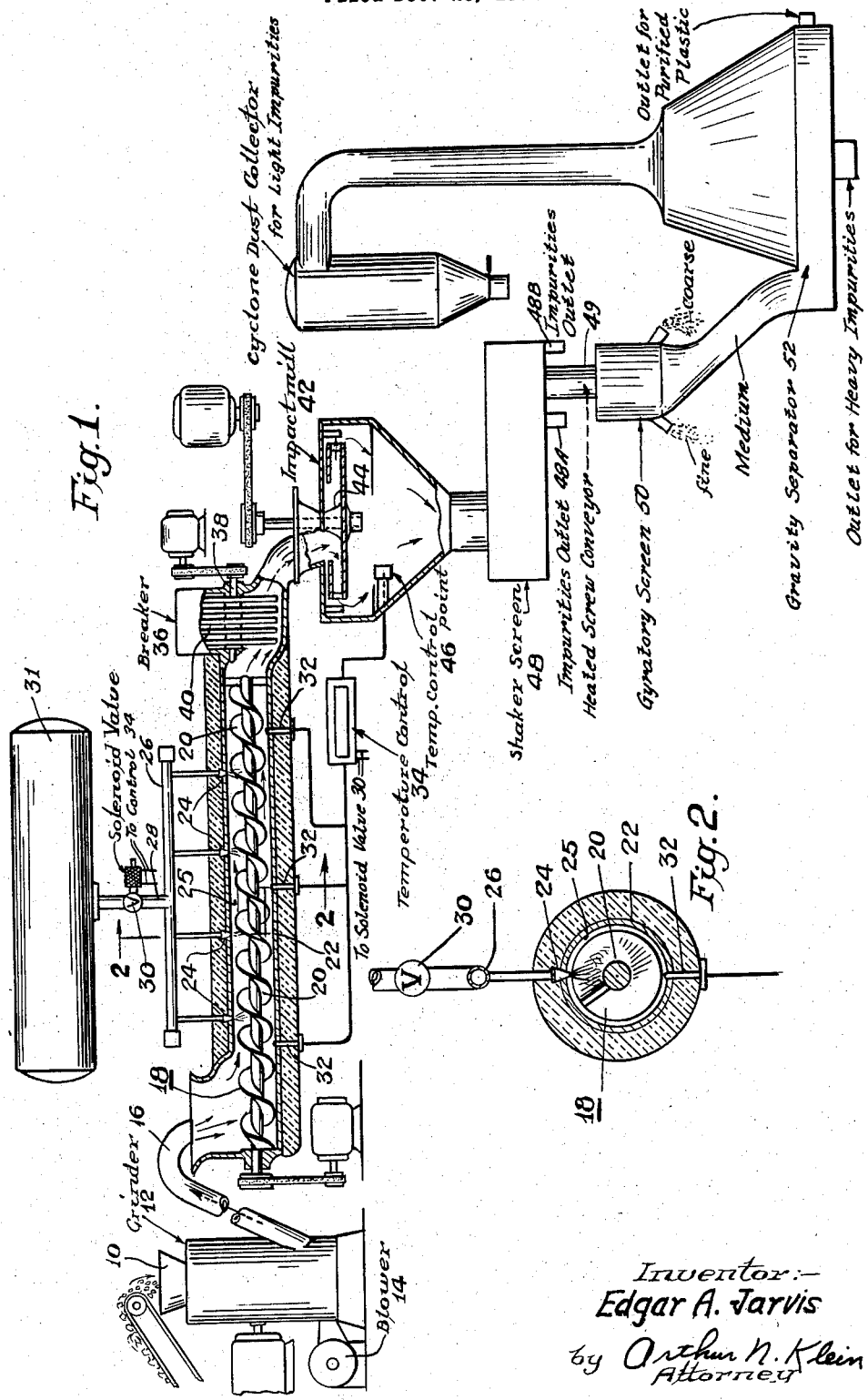

2,879,005

METHOD OF REFINING SCRAP PLASTIC AND APPARATUS THEREFOR

Edgar A. Jarvis, Philadelphia, Pa., assignor to Melvin Sobel, Philadelphia, Pa.

Application December 29, 1954, Serial No. 478,418

17 Claims. (Cl. 241—14)

The present invention relates to a method of refining scrap or waste plastic containing imbedded and occluded impurities and to apparatus for refining scrap plastic.

The refining of scrap plastic containing imbedded impurities to permit its reprocessing has conventionally been effected by heating the plastic, which may be a vinyl resin, such as polyvinyl alcohol or polyvinyl chloride, as well as other plastics such as polyethylene, Teflon, methyl methacrylate, polystyrene, etc., to effect liquefaction thereof, and then separating the impurities by filtration or other separating methods. Such impurities may include ferrous and/or non-ferrous metal particles, and also impurities such as cotton, paper, masking tape, cellophane tape, wood fragments, leather fragments, glass chips, stone particles, etc.

The aforementioned heating refining method has not proved altogether satisfactory, because the prolonged heating period required to obtain and retain the plastic in a molten plastic condition and to permit it to be filtered alters the chemical structure of the plastic and changes or modifies its properties.

This invention has as an object the provision of a method for refining or reprocessing scrap or waste plastic in which solid impurities are removed from the plastic without requiring the heating and liquefaction of the plastic.

Another object of the present invention is the provision of apparatus useful for reprocessing or refining scrap plastic.

A further object of the present invention is the provision of apparatus in which particles may be rendered brittle and crushed under closely controlled conditions.

Other objects of the present invention are apparent in the following detailed description, appended claims and accompanying drawings.

For the purpose of illustrating this invention, one form thereof, which is presently preferred, is shown in the accompanying drawings, it being understood, however, that the invention is not limited to the precise arrangements and instrumentalities illustrated.

In the accompanying drawings, wherein like reference characters indicate like parts throughout:

Figure 1 is a flow sheet partially in section, illustrating the process of the present invention.

Figure 2 is a transverse section of the screw conveyor of Fig. 1.

Scrap plastic such as polyvinyl chloride, polyvinylidene chloride, polyvinyl chloride acetate-copolymers, polyethylene cellophane, polystyrene, cellophane, GRS rubber, cellulose acetate, cellulose nitrate or methyl methacrylate, and which contains solid impurities such as metal fragments, etc., is fed through feed hopper 10 into grinder or chopper 12 in which it is ground or chopped to relatively uniform pieces, such as flakes of the order of one inch square, or one inch cubes. Grinder 12 is of conventional design and may comprise any one of the conventional grinder types presently available.

The chopped particles from grinder 12 are conveyed therefrom into screw conveyor 18 as by means of air introduced into grinder 12 from blower 14 through conduit 16 which discharges into the inlet of screw conveyor 18, or belt or bucket conveyor means may be used in conduit 16 to effect the transfer.

Screw conveyor 18 includes a single worm or flight 20 rotating within housing 22. As shown in Fig. 2, housing 22 has an appreciable wall thickness and may, if desired, be insulated to prevent the loss of heat. A plurality of nozzles 24 (in the embodiment shown in the drawings four nozzles are shown, but a larger or smaller number of nozzles may be used), such as nozzles having $\frac{1}{16}$ inch discharge orifice are disposed at uniform spaced distances along the length of screw conveyor 18 and extend through housing 22 into the chamber 25 which encompasses worm 20. Nozzles 24 are interconnected by means of manifold 26 to which refrigerant feed pipe 28 enters. A solenoid valve 30 is situated in refrigerant feed pipe 28 above manifold 26.

Liquid carbon dioxide or other inert refrigerant may be conveyed from a bulk liquid carbon dioxide storage vessel 31 through refrigerant feed pipe 28 and solenoid valve 30 to manifold 26 and thence discharged from nozzles 24 into chamber 25 of screw conveyor 18.

On the underside of screw conveyor 18 are positioned a plurality of thermocouples 32 spaced generally uniformly along the length of screw conveyor 18 and connected to a conventional temperature controlling and recording unit 34.

The crushed plastic from conduit 16 enters the inlet of screw conveyor 18 and is conveyed the length thereof by means of worm 20, which may rotate at a slow speed such as the order of 9 to 18 revolutions per minute. Liquid carbon dioxide is introduced into chamber 25 through nozzles 24 and rapidly lowers the temperature of the plastic to a temperature at which it is rendered brittle. Thus, the temperature of the plastic adjacent the outlet may be from plus 10° F. to minus 120° F. with the requisite temperature depending upon the temperature level required to render the plastic brittle. An outlet temperature of the order of minus 20° F. to minus 30° F. is normally adequate as a brittling temperature for most plastics. This temperature will not, however, render the solid impurities within the plastic brittle. The thermocouples 32 indicate the temperature of the plastic at various points along screw conveyor 18 and this information is noted on unit 34.

Adjacent the outlet of screw conveyor 18 is a rotary breaker 36 comprising a rotating shaft 38 on which are mounted a plurality of fixed cutters or teeth 40. Rotary breaker 36 pulverizes into coarse particles the brittle cooled plastic discharged from the outlet of screw conveyor 18.

The pulverized plastic particles from rotary breaker 36 are gravity fed to a high speed rotary impact mill 42 having a rapidly rotating rotor 44. The pulverizing portion of rotary impact mill 42 may be of conventional design, such as the Entoleter mill made by Entoleter Division, Safety Car Heating & Lighting Co., Inc., New Haven, Conn. A temperature sensor 46 is operatively connected to the temperature controlling unit 34 and is situated within rotary impact mill 42 so as also to regulate and regulates the rate of introduction of refrigerant liquid carbon dioxide into chamber 25 of conveyor 18. Thus, the fineness of pulverization achieved by rotary impact mill 42 is determined by the temperature of the plastic particles therewithin as well as the speed of rotor 44. The temperature of the plastic particles within rotary impact mill 42 is regulated by controlling the rate of discharge of carbon dioxide into screw conveyor 18 so that the temperature within rotary impact mill 42 is low enough to permit the requisite degree of fine pulverization of the plastic to be achieved therein. Thus, temperature sensor 46 coacts with unit 34 to open or close solenoid valve 30, regulating the flow of liquid carbon dioxide into chamber 25 of screw conveyor 18. Alternatively, the opening and closing of solenoid valve 30 con be controlled by the thermocouples 32 (preferably the terminal thermocouple) within chamber 25 of conveyor 18 coacting with unit 34.

Within rotary impact mill 42 the brittle plastic is finely pulverized. However, the metal particles and/or other non-brittle impurities contained within the plastic, which have not been rendered brittle due to contact with the liquid carbon dioxide, retain their size and shape and are not for the most part pulverized in rotary impact mill 42.

The finely pulverized plastic as well as the impurities are transferred from the bottom of rotary impact mill 42 by gravity to double deck shaker screen 48. In double deck shaker screen 48, which may be of conventional construction such as the so-called Rotex double deck shaker mechanism made by the Orville Simpson Corporation of Cincinnati, Ohio, nonpulverized larger-size impurities are separated from the finely pulverized plastic powder and the impurities are discarded after leaving the screen 48 through discharge conduits 48–A and 48–B.

The finely pulverized plastic powder, which optionally may be first passed through a conventional magnetic separator (for example—a Dings magnetic separator made by Dings Company, Milwaukee, Wisconsin), not shown, in order to remove ferrous particles, is then conveyed from the double deck shaker screen 48 through a discharge conduit 49 by a heated screw conveyor (not shown) disposed within said conduit 49 to prevent condensation to a gyratory screen 50 of conventional design, as disclosed for example in Chemical Engineering Handbook (third edition 1950), p. 958, and as sold by Richmond Manufacturing Company of Lockport, New York, under the name "Gyrosifter," where the pulverized plastic is classified by mesh size (for example −14 +20, −20, +28, −28 +35, −35 +48) preliminary to final purification.

Each of the different mesh size fractions is separately conveyed to gravity separator 52 of conventional design where air flotation is used to effect a final separation of the plastic powder from same-size but different density impurities which still remain; the heavy impurities, such as ferrous and non-ferrous metals, stones and glass are removed at the base of separator 52 and the light impurities such as fine lint are removed overhead by a dust collector and the purified plastic powder at an intermediate point.

The reprocessed plastic powder may, if desired, be blended with additional plastic or other components, in a tumbling mill to obtain a product having a uniform color.

The present invention may be embodied in other specific forms and, therefore, the foregoing description is to be considered in all respects merely as illustrative and not restrictive, reference being made to the appended claims as indicating the scope of this invention.

Having thus described my invention, I claim as new and desire to protect by Letters Patent the following:

1. A method of purifying scrap plastic material by removing solid impurities therefrom, including the steps of chopping the material into relatively coarse discrete particles; moving the chopped particles along a generally enclosed path while introducing cold fluid refrigerant to lower the temperature of the particles to between about −120° F. and about +10° F. sufficiently low to embrittle the plastic portion of the material while leaving its solid impurities substantially unaffected; thereafter subjecting the cooled material to high speed pulverizing so as to pulverize the embrittled plastic while leaving the solid impurities for the most part unpulverized; regulating the rate of addition of refrigerant subject to variations in temperature during the high speed pulverizing so as to maintain the desired embrittling temperature range; and subsequently separating the pulverized plastic from its impurities.

2. A method according to claim 1 wherein the pulverizing is accomplished by high-speed rotary impact grinding.

3. A method according to claim 2 wherein the refrigerant is compressed liquefied carbon dioxide and is introduced into the chopped plastic material simultaneously at a plurality of points spaced longitudinally along the path of movement of said material.

4. A method according to claim 1 wherein the separating of the pulverized plastic material from the impurities includes a screening operation to remove the larger-size unpulverized impurities.

5. A method according to claim 4 wherein the separating further includes a gravity-separation of the pulverized material from the screening operation so as to disassociate the plastic portion thereof from both lighter and heavier impurities and wherein the pulverized material is heated during its passage from the screening operation to the gravity-separation.

6. A method according to claim 5 wherein the separating also includes a gyratory sifting operation directly after the screening operation to provide different-mesh fractions of the screened pulverized material for individual treatment in the gravity-separation operation.

7. In apparatus for reclaiming scrap plastic material having foreign material therein such as thread and metallic particles, the combination of refrigerating means for cooling said material, centrifugal apparatus for impacting said cooled material to reduce its size, a first classifying means to remove thread and oversize particles from said impacted material, heating means to prevent moisture condensation on the remaining stream from the classifying means, a second classifying means to separate the heated material into classes of similar sized particles, and separating means to remove remaining foreign material from said plastic material by means of gravity and air flotation.

8. In apparatus for reclaiming scrap plastic material having foreign material therein such as thread and metallic particles, the combination of means for cutting said material into small pieces, means for mixing said cut plastic with carbon dioxide refrigerant, temperature sensitive control means to regulate the amount of carbon dioxide mixed with said plastic to cool the plastic to a rigid brittle state, centrifugal apparatus for impacting said material to reduce its size, heating means for said reduced material to prevent moisture condensation on the impacted material, and means for separating foreign material from said reduced plastic.

9. For use in the removal of solid impurities from scrap plastic material so as to enable said scrap plastic to be purified and re-used, chopping means for reducing the material to relatively coarse discrete particles; an elongated housing having a generally cylindrical chamber formed therein; means for transferring the coarse chopped material from the chopping means to the inlet end of said chamber; a power-driven conveying screw axially disposed within said chamber and constructed and arranged gradually to move the coarse chopped material along said chamber from the inlet end thereof to the opposite or outlet end thereof; means for introducing a cold fluid refrigerant into said chamber so that the chopped material is intimately mixed with the refrigerant and cooled thereby during its passage through the chamber, said means including a refrigerant delivery pipe line, an electrically controlled valve operatively connected within said pipe line so as to regulate the rate of flow of refrigerant therethrough, and at least one delivery nozzle connected to said pipe line and communicating with said chamber; means for automatically controlling the rate of introduction of the fluid refrigerant into said chamber, said means including a temperature sensor for the material emerging from the chamber, adjustable control mechanism operatively connected with and actuated by said sensor and also operatively connected to the refrigerant pipe line valve, whereby the rate of introduction of the fluid refrigerant into the chamber is automatically regulated so as to cool the chopped material to between about −120° F. to about +10° F. so as to embrittle the plastic portion of the chopped material while leaving its solid impurities substantially unaffected; high-speed pulverizing means; means for conveying the cooled scrap plastic material from the outlet end of said chamber to said high-speed pulverizing means; and means for subsequently separating the comminuted or pulverized plastic portion of the material leaving the high-speed pulverizing means from the impurities.

10. Apparatus according to claim 9 wherein the last-mentioned separating means includes shaker-screen mechanism for disassociating the finer-mesh pulverized material from the coarser-mesh impurities.

11. Apparatus according to claim 10 wherein the separating means also includes gravity separator means for treating the pulverized material from the shaker-screen mechanism so as to disassociate the plastic portion thereof from both lighter and heavier impurities and heated conveying means for transferring the pulverizing material from the shaker-screen.

12. Apparatus according to claim 11 wherein the separating means further includes gyratory screen means interposed between the shaker-screen mechanism and the gravity separator means and wherein the heated conveying means is interposed between the shaker-screen mechanism and the gyratory screen means.

13. Apparatus according to claim 9 wherein the high-speed pulverizing means comprises a high-speed rotary impact mill, and wherein the temperature sensor is disposed within the rotary impact mill and operatively connected to the adjustable control mechanism.

14. Apparatus according to claim 13 wherein a power-driven breaker is interposed between the outlet end of the cylindrical refrigerating chamber and the high-speed rotary impact mill to provide preliminary coarse breaking up of the refrigerated material entering the rotary impact mill.

15. Apparatus according to claim 13 wherein the refrigerant delivery pipe line leads to a manifold which in turn connects with a plurality of refrigerant delivery nozzles communicating with and spaced axially along the cylindrical chamber.

16. Apparatus according to claim 15 wherein a plurality of temperature sensors are spaced axially along the cylindrical refrigerating chamber, all of the sensors being operatively connected to the adjustable control mechanism for the refrigerant pipe line valve.

17. Apparatus according to claim 13 wherein the refrigerant delivery pipe line leads from a reservoir of compressed liquefied carbon dioxide.

References Cited in the file of this patent
UNITED STATES PATENTS

| | | |
|---|---|---|
| 271,138 | Sharpneck | Jan. 23, 1883 |
| 448,516 | Gardner | Mar. 17, 1891 |
| 1,484,208 | Davis | Feb. 19, 1924 |
| 1,632,520 | Sutton | June 14, 1927 |
| 1,750,508 | Cornelius | Mar. 11, 1930 |
| 1,978,204 | Hurt | Oct. 23, 1934 |
| 2,012,155 | Belmke | Aug. 20, 1935 |
| 2,091,297 | Ximenez | Aug. 31, 1937 |
| 2,236,806 | Sutton | Apr. 1, 1941 |
| 2,241,654 | Arnold | May 13, 1941 |
| 2,286,225 | Noyes | June 16, 1942 |
| 2,289,727 | Randolph | July 14, 1942 |
| 2,316,124 | Sheldon | Apr. 6, 1943 |
| 2,462,645 | Knowland | Feb. 22, 1949 |
| 2,471,043 | Schenck | May 24, 1949 |
| 2,609,150 | Bludeau | Sept. 2, 1952 |
| 2,609,993 | Planiol | Sept. 9, 1952 |
| 2,644,740 | Dodds | July 7, 1953 |

FOREIGN PATENTS

| | | |
|---|---|---|
| 323,351 | Germany | July 26, 1920 |

OTHER REFERENCES

Electric Heating of Screens, by G. W. Craiglow, published in American Ceramic Society Bulletin, volume 29, January 1950.